R. C. BENDER.
MANIFOLD INVOICE SHEET, EXPRESS RECEIPT, AND SHIPPING TAG.
APPLICATION FILED MAY 29, 1916.
1,220,589.
Patented Mar. 27, 1917.
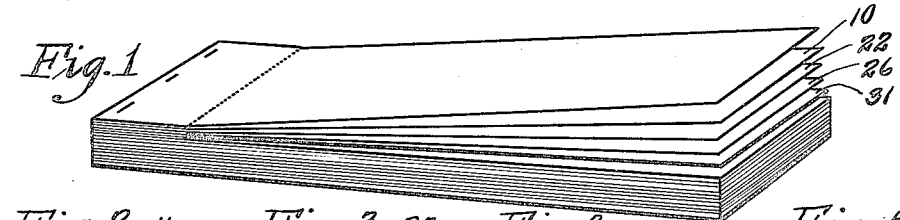
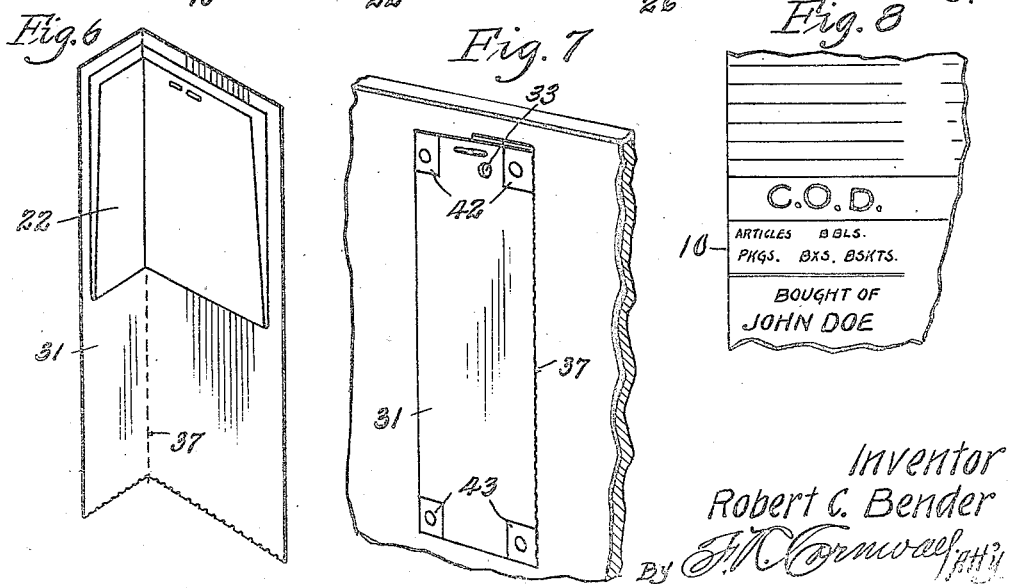

UNITED STATES PATENT OFFICE.

ROBERT C. BENDER, OF ST. LOUIS, MISSOURI.

MANIFOLD INVOICE-SHEETS, EXPRESS-RECEIPT, AND SHIPPING-TAG.

1,220,589.

Specification of Letters Patent. Patented Mar. 27, 1917.

Application filed May 29, 1916. Serial No. 100,690.

*To all whom it may concern:*

Be it known that I, ROBERT C. BENDER, a citizen of the United States, residing at St. Louis, Missouri, have invented a certain new and useful Improvement in Manifold Invoice-Sheets, Express-Receipts, and Shipping-Tags, of which the following is a full, clear, and exact description, such as will enable others skilled in the art to which it appertains to make and use the same, reference being had to the accompanying drawings, forming part of this specification.

My invention relates generally to a recording sales system and more particularly to manifolding arrangement of invoice sheets, express receipts, and shipping tags, particularly adapted for retail business purposes where a complete record of a sales transaction is desired, and which transaction includes the packing of goods and the shipment thereof by express or other common carrier.

The principal object of my invention is to materially reduce the time and labor involved in making out invoice sheets, an express receipt and shipping tag relating to the goods sold and which are to be shipped to the buyer, and further to reduce to a minimum the liability of mistakes in filling out the various invoice sheets, express receipt and shipping tag, the accomplishment of which objects results in a material saving of time and expense in the clerical work incident to selling transactions in addition to resulting in greater accuracy in the packing and delivery of the order to the buyer or consignee.

With the foregoing and other objects in view, my invention consists in certain novel features of construction and arrangement of parts, hereinafter more fully described, claimed and illustrated in the accompanying drawings, in which—

Figure 1 is a perspective view of a pad made up of my improved invoice sheet, express receipt, and shipping tag.

Fig. 2 is a view of the front face of the first or top sheet of each series, and which sheet is known as the original invoice.

Fig. 3 is a face view of the second sheet and which serves as the customer's invoice.

Fig. 4 is a face view of the third sheet, which serves as an express receipt.

Fig. 5 is a face view of the fourth sheet which serves as a combined shipping tag, packing slip and invoice and packer's check sheet.

Fig. 6 is a view looking at the rear side of the shipping tag, the same being partially folded and carrying the customer's invoice, said shipping tag and customer's invoice being particularly shown.

Fig. 7 is a perspective view illustrating the shipping tag as it appears when applied to a barrel, box or the like.

Fig. 8 is a fragmentary view of a portion of the original invoice sheet which is utilized where goods are sent C. O. D. to a purchaser.

The original invoice sheet 10 is preferably formed of paper, substantially rectangular in form, and is provided at its upper end with a comparatively narrow section 11 which serves as a stub whereby the sheet may be bound to the other sheets forming a book or package.

A row of perforations 12 is formed between the body of the sheet 10 and the stub portion 11, thus permitting said sheet 10 to be readily removed when properly filled out.

Formed through the sheet 10 near the top and center is an aperture 13 which permits the sheet to be placed on a suitable hook or binder pin while the order which is written upon the sheet is being filled or after the transaction has been completed.

Appearing on the upper portion of the sheet 10 and preferably in the upper right hand corner thereof is a serial number 14 by means of which the individual orders are identified and as will be understood, the remaining sheets of each set or series are printed with the same serial number.

Printed in the upper left hand corner of the sheet 10 are suitable lines 15 on which may be written the date on which a sale is made, the name of the buyer, or consignee, and likewise his address. A considerable space on the face of the sheet near the center and left hand side is printed with horizontal lines 16, thereby forming spaces adapted to receive written data relating to the items purchased by the customer, and to the right of these lines are printed lines 17 which form two columns of spaces adapted to receive written data indicating the price per article and the total amount of the charges thereof.

Printed in the space between the lines 16 and 17 and preferably arranged vertically on the sheet are the words Original invoice which is the title of this particular sheet. Immediately below the lines 16 is a space 18 in which is printed such data as Bbls., Bxs., Bskts., and Pkgs. These different indications are to be suitably checked with a pencil mark to indicate how the receptacle or receptacles in which the customer's order is to be packed and shipped.

Printed immediately beneath the data just described is the name of the person or business house that uses the system disclosed by my invention, and immediately beneath this printed name are lines 19 opposite which is printed the words Time and Exp. Co. The space 20 immediately below the matter just described is adapted to receive printed matter relating to the terms or conditions on which the individual or business house utilizing the system does business.

In the space immediately beneath the lines 17 is a blank space 21 and upon the left hand portion thereof is printed the word Remarks and thus said space is adapted to receive written data in the nature of remarks relating to the transaction which is set forth on this particular sheet.

The second sheet 22 of the series and which is normally positioned immediately beneath the sheet 10 and which serves as the customer's invoice is the same size and printed identically the same as the original invoice hereto described, with the exception that in the space between the lines 16 and 17, said second sheet is printed with the words Customer's invoice, thus indicating that this particular invoice sheet is to be delivered with the consignment to the customer or consignee. This sheet 22 is provided at its upper end with a stub 23, with an aperture 24, which corresponds with the aperture 13, and with a serial number 25 which corresponds with the serial number 14.

The sheet forming the customer's invoice is preferably of a different color from the original invoice sheet in order that the two sheets may be readily distinguished.

The third sheet 26 of the series or the one which lies immediately beneath the customer's invoice is the same size and printed with the same matter as the two preceding sheets, with the exception that immediately beneath the lines 19 which are printed with the headings Time and Exp. Co. appears a line 27 on which is printed the word Per, said line being adapted to receive the written signature of the agent who receives the package for the express company or other common carrier. Further, in the space between the lines 16 and 17, this third sheet 26 is printed with the words Express receipt, and thus said sheet serves as an express receipt for the package containing the goods described on the various sheets. This express receipt is preferably of a different color from the original invoice and customer's invoice sheets in order to readily distinguish the various sheets.

The express receipt is provided at its upper end with a stub 28 corresponding to the stubs 11 and 23, and further, said express receipt is provided with an aperture 29 corresponding to the apertures 13 and 24 and with a serial number 30 which corresponds to the serial numbers 14 and 25.

The fourth sheet 31 of the series and which lies immediately beneath the express receipt is preferably formed of light weight cardboard or material which is substantially heavier than the three other sheets, and said fourth sheet being provided at its upper end with a tab 32 corresponding to the tabs at the upper ends of the previously described sheets. Said fourth sheet is also provided with an aperture 33 corresponding to the apertures of the previously described sheets and with an index number 34 corresponding to the index numbers on the other sheets of this series.

Printed on the face of the fourth sheet is a series of horizontally disposed lines 35 corresponding to the lines 16 on the original invoice sheet and appearing to the right of these lines 35 are lines 36 which correspond to the lines 17 on the original invoice sheet. The space above the lines 35 is printed with the same headings which appear in the corresponding space on sheet 10 and in the space above the lines 36 appears the words Packed by and a line on which is to be written the name or number of the person packing this particular order of goods. A line of perforations 37 which is parallel with the side edges of the sheet 31 extends from the line of perforations between the body of said sheet, and its tab 32 to a point near the bottom of said sheet and the lower end of said line of perforations terminates at a transversely disposed row of perforations 38, which lies parallel with the bottom edge of the sheet. This arrangement forms a readily detachable tab or section 39 at the lower end of the sheet 31 and printed on said detachable tab in a serial number 40 corresponding to the serial number 34, the word Remarks, and a line 41, which is preceded by the work Packer. This tab is adapted to receive written data relating to the packing of the order called for on this sheet, together with the name or number of the person who personally performs the packing operations.

Immediately to the rear of the line of perforations 37 and between the lines 35 and 36 is printed the words Tag invoice. Blank spaces 42 are formed by suitably printed lines at the corners where the line of perforations between the body of the sheet 31 and its stub 32 unite with the left hand edge of said sheet and with the row of perforations 37, and corresponding spaces 43 are formed at the corners where the row of perforations 38 join the left hand edge of the sheet and the row of perforations 37. These spaces 42 and 43 are adapted to receive tacks which fasten the shipping tag to the box or barrel which contains the goods shipped to the customer.

Immediately beneath the serial number 34 on the tag invoice is a line 44 above which is printed the words Packed by, such space above said line being adapted to receive the written name of the packer.

When a salesman or invoice clerk receives an order, he places carbon sheets between the original invoice and the customer's invoice sheet, between the latter invoice and the express receipt and between the latter and the tag invoice, and then writes the data relating to said order on the face of the original invoice sheet.

The date, name of the purchaser or consignee, and the address are written in the proper spaces above the lines 15 and then are written the numbers and names of the items purchased, together with the price per item and the total amounts in the spaces between the lines 16 and 17.

The container which the goods are to be packed in is now suitably checked or indicated by means of a mark made opposite the titles in the space 18 and then are written on the lines 19 the time when the shipment is to be ready for delivery to the express company or carrier; likewise the name of said express company or carrier. Any remarks relating to the order or shipment may be written in the space 21.

Inasmuch as the various spaces and lines on the three sheets 10, 22, 26 and the card 31 coincide, the matter thus written on the original invoice sheet will be transferred by means of the carbon sheets to the customer's invoice sheet, the express receipt and the tag invoice.

The three sheets and the tag are now removed from the book or block in which they are bound and the original invoice sheet is placed on a hook or in a suitable receptacle from whence it can later be taken and utilized in the keeping of the accounts of the firm using my improved system. The customer's invoice and express receipt are now placed on suitable hooks or in receptacles and the tag invoice is delivered to the packer and thus temporarily becomes a combined packing slip and packer's check.

The packer places the various items mentioned on the tag in a receptacle, which latter is indicated in the space 18, and after the articles have been properly packed and checked off, the packer writes his name in the spaces above the lines 41 and 44. Any data which the packer may desire to write regarding the order which he has filled may be written on the face of the tab section 39 and upon the blank space immediately beneath the lines 36.

The packer now removes the tab section 39 containing his name and the serial number 40 and delivers said tab to the proper person to indicate that the work of packing the order has been properly attended to. This tab may be retained so as to check up the work of the packer in the event that the customer or consignee makes complaint relative to his order or consignment.

The packer now takes the corresponding customer's invoice from its hook or receptacle and after folding the same transversely at its center with its face inside, said invoice sheet is attached to the rear side of the tag invoice in any suitable manner, preferably by means of a staple as illustrated in Fig. 6.

That portion of the tag invoice to the right of the perforated line 37 and the corresponding portions of the customer's invoice sheet which is positioned on the rear of said tag invoice are now folded onto the rear of the main body portion of the tag invoice and tacks or the like are now driven through the tag invoice within the spaces 42 and 43, and thus said tag invoice becomes a shipping tag and a retainer for the customer's invoice. The upper portion of the shipping tag thus formed contains the name and address of the consignee, the date on which the order was filled, a list of the items constituting the order, together with the name of the consignor and a copy of the data written in the space 18 and upon the lines 19.

When the agent for the express company or common carrier calls for the package, he takes the express receipt from its hook or holder and after comparing the serial number on said receipt with the serial number on the shipping tag attached to the container, writes his name on the line 27, and thus the sheet 26 forms a signed express receipt and may be filed in a suitable binder or placed in a suitable container for record.

When the consignee receives the package, the express tag is removed and the customer's invoice sheet is removed from said tag. Thus, it will be seen that my improved system provides for the filling out by one person of the original invoice sheet, the customer's invoice sheet, the express receipt, and the tag invoice, thus materially reducing the time and labor involved where the customer's invoice, the express receipt, and tag invoice are copied by different persons from the original invoice.

Further, my improved system eliminates mistakes in data which are liable to occur where such data are copied from one sheet to another by different persons and the improved system materially lessens the work of the bookkeeper in taking care of accounts.

The tag invoice forming a part of my invention in addition to containing the same data as the original invoice, serves as a packing slip, a packer's check, a shipping tag, and a holder for the customer's invoice.

It will be readily understood that minor changes in the form and arrangement of the various parts of my improved system may be varied without departing from the spirit of my invention, the scope of which is set forth in the appended claim.

I claim:

In a recording sales system, a series of separate and independent sheets of uniform size, said series comprising an original invoice sheet provided with printed headings and spaces adapted to receive written data, a customer's invoice sheet printed with headings and provided with spaces which are identical with the headings and spaces on the original invoice sheet, an express receipt sheet printed with headings and provided with spaces which are identical with the headings and spaces on the original invoice sheet, and a separate and independent shipping tag printed with headings and provided with spaces which are identical with the headings and spaces on the three previously mentioned sheets, said shipping tag being formed of material which is substantially heavier than the material in the three other sheets, and being provided with weakened lines whereby a predetermined portion of said tag bearing certain data can be readily detached from the main body of the tag, and to permit another predetermined portion of the tag bearing certain data to be folded into position behind the other portion when said tag is applied to a container.

In testimony whereof I hereunto affix my signature this 24th day of May, 1916.

ROBERT C. BENDER.